United States Patent
Porseland et al.

(10) Patent No.: US 10,521,957 B2
(45) Date of Patent: Dec. 31, 2019

(54) METHODS AND SYSTEMS FOR RECONSTRUCTING GIS SCENES

(71) Applicant: Google LLC, Mountain View, CA (US)

(72) Inventors: Karl Henrik Porseland, Mountain View, CA (US); Christopher Roush, Palo Alto, CA (US); Michael Tavendale, Union City, CA (US); Ted Patrik Gert Blohme, San Francisco, CA (US)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 15/831,707

(22) Filed: Dec. 5, 2017

(65) Prior Publication Data

US 2019/0172259 A1    Jun. 6, 2019

(51) Int. Cl.
| | |
|---|---|
| *G06T 1/00* | (2006.01) |
| *G06F 16/29* | (2019.01) |
| *G06F 16/50* | (2019.01) |
| *G06F 16/957* | (2019.01) |
| *G06T 17/05* | (2011.01) |

(52) U.S. Cl.
CPC .............. *G06T 17/05* (2013.01); *G06F 16/29* (2019.01); *G06F 16/50* (2019.01); *G06F 16/9577* (2019.01); *G06T 1/0007* (2013.01)

(58) Field of Classification Search
None
See application file for complete search history.

(56) References Cited

U.S. PATENT DOCUMENTS

2019/0004793 A1* 1/2019 Brebner ................... G06F 8/41

* cited by examiner

*Primary Examiner* — Idowu O Osifade
(74) *Attorney, Agent, or Firm* — Dority & Manning, P.A.

(57) ABSTRACT

The present disclosure is directed to methods and systems for reconstructing geographic information system (GIS) scenes. In particular, the methods and systems of the present disclosure can receive data indicating a user intention to save an image from a GIS application. Responsive to receiving the data indicating the user intention to save the image, image data representing the image from the GIS application can be generated. The image data can comprise metadata configured to cause the GIS application to reconstruct a scene comprising the image.

20 Claims, 6 Drawing Sheets

METHODS AND SYSTEMS FOR RECONSTRUCTING GIS SCENES

FIELD

The present disclosure relates generally to geographic information systems. More particularly, the present disclosure relates to methods and systems for reconstructing geographic information system (GIS) scenes.

BACKGROUND

GIS applications can capture, store, manipulate, analyze, manage, present, display, integrate, edit, share, and/or the like spatial and/or geographic information, and/or the like. Such applications can enable users to create, analyze, edit, present, display, share, and/or the like spatial and/or geographic information. GIS applications can relate information (e.g., otherwise unrelated information, and/or the like) based on location (e.g., as a key index variable, and/or the like). GIS applications are valuable tools for individuals in the mapping, media, news, fields of scientific inquiry, and/or the like.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by one or more computing devices, data indicating a user intention to save an image from a GIS application. The method can further include, responsive to receiving the data indicating the user intention to save the image, generating, by the one or more computing devices, image data representing the image from the GIS application and comprising metadata configured to cause the GIS application to reconstruct a scene comprising the image.

Another example aspect of the present disclosure is directed to a system. The system can include one or more processors and a memory storing instructions that when executed by the one or more processors cause the system to perform operations. The operations can include receiving, from one or more computing devices, a request for a new image associated with a scene being depicted by a GIS application executing on the one or more computing devices. The request can comprise data generated, by the GIS application, based on metadata included in image data representing a different image associated with the scene. The metadata can be configured to cause the GIS application to reconstruct at least a portion of the scene comprising the different image. The operations can further include, responsive to receiving the request, communicating, to the one or more computing devices, image data representing the new image.

Another example aspect of the present disclosure is directed to one or more non-transitory computer-readable media. The one or more non-transitory computer-readable media can comprise instructions that when executed by one or more computers cause the one or more computers to perform operations. The operations can include receiving, from one or more other computers, image data representing an image from a GIS application and comprising metadata configured to cause the GIS application to reconstruct a scene comprising the image. The operations can further include, responsive to receiving the image data, reconstructing, based on the metadata, the scene comprising the image.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Example aspects of the present disclosure are directed to reconstructing geographic information system (GIS) scenes. In particular, a user can utilize a GIS application to navigate to a scene. The user can request to save an image of the scene from the GIS application, and in response to the request, the GIS application can generate image data representing the image (e.g., an image file, and/or the like). In accordance with aspects of the disclosure, the image data can include metadata configured to cause the GIS application to reconstruct the scene from which the image was saved.

In some embodiments, the GIS application can be configured to execute within a web-browser application. In some embodiments, the user can request to save the image by dragging at least a portion of the image within and/or from a user interface of the GIS application (e.g., from the user interface to a desktop, file folder, and/or the like).

In some embodiments, the user can communicate (e.g., via a network, and/or the like) the image data to another computing device (e.g., a device distinct from the device on which the GIS application was executing when the image was saved, and/or the like), which can receive the image data. The receiving computing device can open the image data (e.g., within the GIS application, and/or the like) and can reconstruct the scene from which the image was saved based on the metadata included in the image data. In such embodiments, a user of the receiving computing device can navigate within the reconstructed scene (e.g., by panning, zooming, and/or the like). In response to the user navigating, the computing device can generate a request for a new image associated with the scene. For example, the user can pan the scene to the left and a request can be generated for an image comprising portions of the scene located to the left. The request can be generated based on the metadata included in the image data. For example, the metadata could include data indicating a position of a camera that captured the image, and the request could be generated to request an image captured by the camera at an adjacent position (e.g., to the left, and/or the like).

The request can be communicated by the computing device to a remotely located computing system (e.g., a server hosting imagery associated with the GIS application, and/or the like), which can receive the request, identify the requested new image, generate image data representing the new image, and communicate the image data representing the new image to the computing device. The computing device can receive and process the image data representing the new image (e.g., display the new image (or a portion thereof) within the GIS application, and/or the like).

It will be appreciated that the image data could additionally or alternatively be opened on the computing device on which the GIS application was executing when the image was saved, and that such device could utilize the included metadata to reconstruct the scene comprising the image and/or allow a user to navigate within the scene as described above with respect to the distinct receiving device. For example, the operations (e.g., requesting to save the image, generating the image data comprising the metadata, opening the image data, navigating within the scene, and/or the like) could be performed on the same computing device or across multiple distinct computing devices.

Many types of imagery are suitable for use with the subject matter described herein. For example, the imagery could include map imagery, satellite imagery, aerial imagery, panoramic imagery, ground-level imagery, street-level imagery, and/or the like.

In some embodiments, generating the image data can include generating an image sequence comprising multiple frames. The frames of the image sequence can include the saved image. In such embodiments, each of the frames can include: image data representing an image from the scene corresponding to the frame; and metadata configured to cause the GIS application to reconstruct at least a portion of the scene comprising the image from the scene corresponding to the frame.

In some embodiments, generating the image data can include generating a serialized JavaScript object notation (JSON) object comprising the metadata. Additionally or alternatively, generating the image data can include generating image data in accordance with a predetermined format (e.g., an exchangeable image file format (EXIF), an extensible metadata platform (XMP) format, and/or the like). For example, image data in accordance with EXIF could include one or more tags that contain at least a portion of the metadata. For example, the tag(s) could include a tag designated for indicating a manufacturer of a camera (e.g., an Exif.Photo.MakerNote tag, and/or the like). In some embodiments, generating the image data can include determining (e.g., based on a camera position associated with the image, and/or the like) global positioning system (GPS) data (e.g., latitude and longitude coordinates, and/or the like) for the image. In such embodiments, the metadata included in the image data can include the GPS data (e.g., in an Exif.GPSInfo tag, and/or the like).

Additionally or alternatively, the metadata can include data indicating one or more of a position of a camera that captured the image, a rotation of a camera that captured the image, a field of view of a camera that captured the image, a depth of field of a camera that captured the image, a time associated with the image, whether imagery associated with a body of water is included in the image, a level of visibility associated with the image, whether the image includes imagery of one or more clouds, a version of the GIS application, a version of a web-browser application in which the GIS application is executing, and/or the like.

The methods and systems described herein can provide a number of technical effects and benefits. For example, the methods and systems described herein can enable a user to save an image from a scene displayed by a GIS application such that when the image is opened (e.g., in the GIS application, by the user, another user, and/or the like) the scene from which the image was saved can be reconstructed. This functionality can improve the user experience of the GIS application, for example, by allowing a user to efficiently return to a scene previously viewed, allowing a user to communicate the scene to another user, allowing a user to navigate within the scene from a point within the scene at which the image was saved, and/or the like. By advantageously providing an ability for users to simply and conveniently reconstruct scenes containing images using the present technology, additional benefits can be realized for content creation in numerous applications including but not limited to mapping, media, news, and/or the like.

With reference now to the Figures, example embodiments of the present disclosure will be discussed in further detail.

Figure 1:
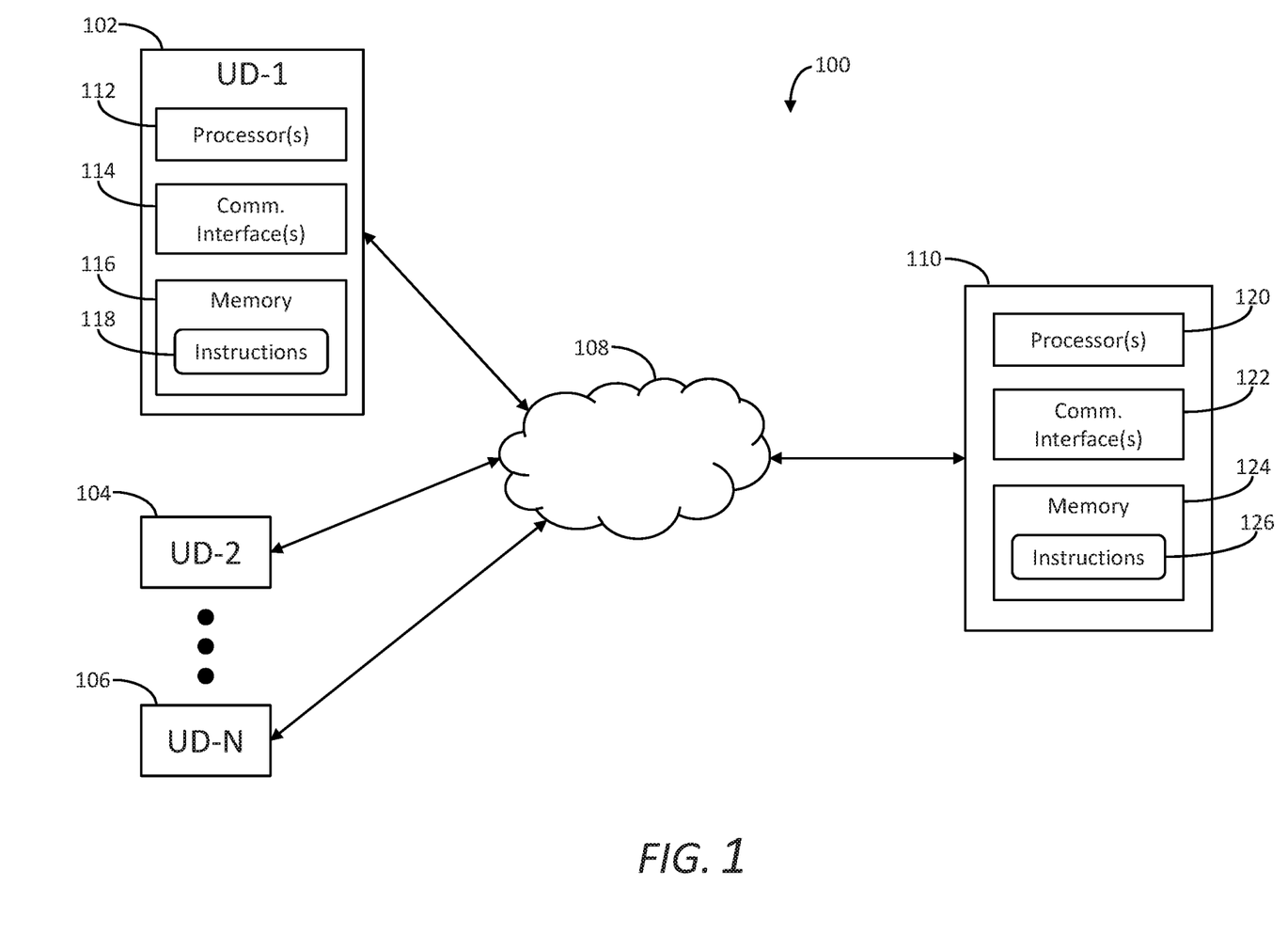
FIG. 1 depicts an example computing environment according to example embodiments of the present disclosure.

FIG. 1 depicts an example computing environment according to example embodiments of the present disclosure. Referring to FIG. 1, environment 100 can include one or more computing devices, networks, and/or computing systems. For example, environment 100 can include user devices 102, 104, and 106, network(s) 108, and computing system 110. Network(s) 108 can include one or more networks (e.g., wired networks, wireless networks, and/or the like) that interface user devices 102, 104, and/or 106 with one another and/or with computing system 110. User devices 102, 104, and/or 106 can include one or more computing devices (e.g., laptop computers, desktop computers, tablet computers, mobile devices, smart phones, display headsets, wearable computing devices, and/or the like) capable of performing one or more of the functions and/or operations described herein. For example, user device 102 can include one or more processor(s) 112, communication interfaces 114, and memory 116. Communication interface(s) 114 can be configured to enable user device 102 to communicate (e.g., via network(s) 108, and/or the like) with user devices 104 and/or 106 and/or computing system 110. Memory 116 can include (e.g., store, and/or the like) instructions 118, which when executed by processor(s) 112 can cause user device 102 to perform one or more of the functions and/or operations described herein. It will be appreciated that user devices 104 and/or 106 can include one or more of the components described above with respect to user device 102.

Computing system 110 can be remotely located (e.g., geographically, and/or the like) from user devices 102, 104, and/or 106 and can include one or more computing devices (e.g., servers, and/or the like) capable of performing one or more functions and/or operations described herein. For example, computing system 110 can include one or more processors 120, communication interfaces 122, and/or memory 124. Communication interface(s) 122 can be configured to enable computing system 110 to communicate (e.g., via network(s) 108, and/or the like) with user devices 102, 104, and/or 106. Memory 124 can include (e.g., store, and/or the like) instructions 126, which when executed by processor(s) 120 can cause computing system 110 to perform one or more of the functions and/or operations described herein.

Figure 2:
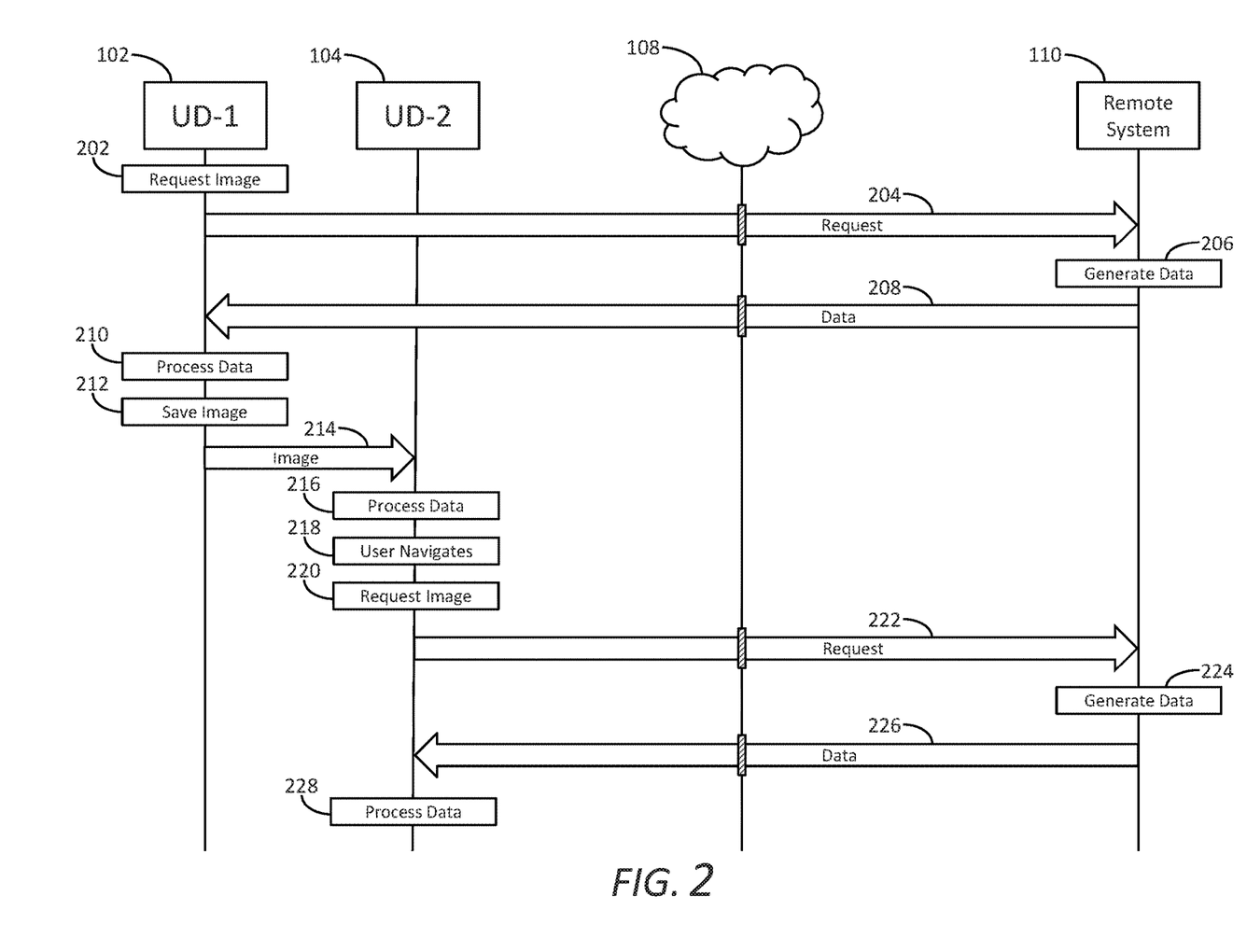
FIG. 2 depicts an example event sequence according to example embodiments of the present disclosure.

FIG. 2 depicts an example event sequence according to example embodiments of the present disclosure. Referring to FIG. 2, at (202), user device 102 can generate a request for an image associated with a GIS scene. For example, user device 102 can be executing a GIS application displaying a scene, and a user of user device 102 can have navigated within the scene, causing user device 102 to generate a request for an image associated with the scene. At (204), user device 102 can communicate (e.g., via network(s) 108, as depicted by the cross-hatched box over the line extending downward from network(s) 108, and/or the like) the request to computing system 110, which can receive the request. Responsive to receiving the request, at (206), computing system 110 can identify the requested image, generate image data representing the requested image, and, at (208), communicate the image data to user device 102. User device 102 can receive the image data and, at (210), can process the image data (e.g., render the image, display the image, and/or the like). The image can include map imagery, satellite imagery, aerial imagery, panoramic imagery, ground-level imagery, street-level imagery, and/or the like.

Figure 3:
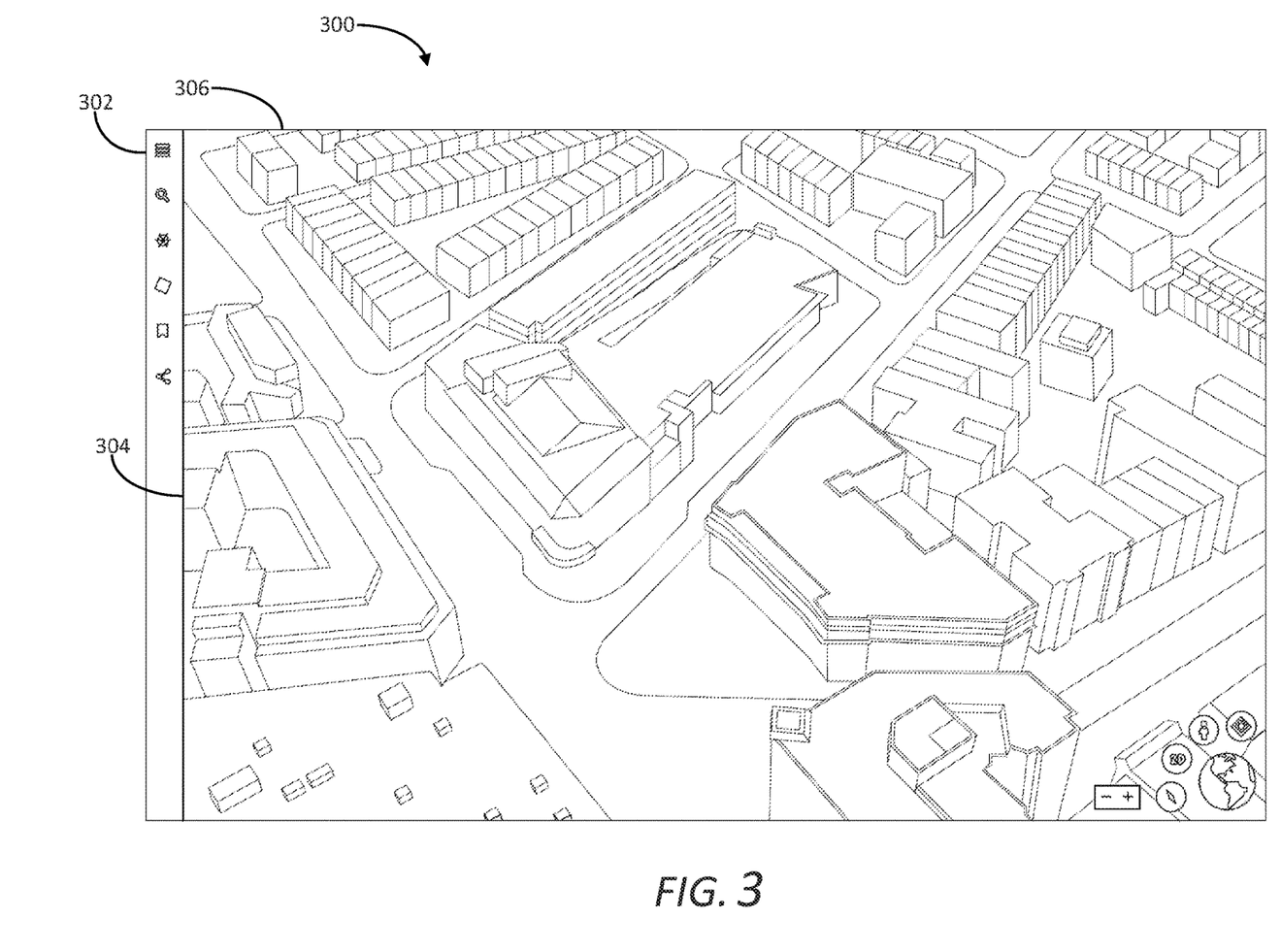
FIG. 3 depicts an example user interface according to example embodiments of the present disclosure.

At (212), a user of user device 102 can request to save (e.g., store, export, copy, and/or the like) the image, which can cause user device 102 to receive data indicating a user intention to save the image from the GIS application. For example, FIG. 3 depicts an example user interface according to example embodiments of the present disclosure. Referring to FIG. 3, interface 300 can comprise a user interface for the GIS application. In some embodiments, the GIS application can be configured to execute within a web-browser application. Interface 300 can include menu 302, viewport 304, and image 306. In some embodiments, the user can request to save image 306 by dragging at least a portion of image 306 within and/or from interface 306 (e.g., from viewport 304 to a desktop, file folder, and/or the like). Additionally or alternatively, the user can request to save image 306 by interfacing with menu 302.

Returning to FIG. 2, responsive to receiving the data indicating the user intention to save image 306, user device 102 can generate image data (e.g., an image file, and/or the like) representing image 306. In accordance with aspects of the disclosure, the image data can include metadata configured to cause the GIS application to reconstruct a scene comprising image 306.

In some embodiments, generating the image data can include generating an image sequence comprising multiple frames. The frames of the image sequence can include image 306. In such embodiments, each of the frames can include: image data representing an image from the scene corresponding to the frame; and metadata configured to cause the GIS application to reconstruct at least a portion of the scene comprising the image from the scene corresponding to the frame.

In some embodiments, generating the image data can include generating a serialized JavaScript object notation (JSON) object comprising the metadata. Additionally or alternatively, generating the image data can include generating image data in accordance with a predetermined format (e.g., an exchangeable image file format (EXIF), an extensible metadata platform (XMP) format, and/or the like). For example, image data in accordance with EXIF could include one or more tags that contain at least a portion of the metadata. For example, the tag(s) could include a tag designated for indicating a manufacturer of a camera (e.g., an Exif.Photo.MakerNote tag, and/or the like). In some embodiments, generating the image data can include determining (e.g., based on a camera position associated with image 306, and/or the like) global positioning system (GPS) data (e.g., latitude and longitude coordinates, and/or the like) for image 306. In such embodiments, the metadata included in the image data can include the GPS data (e.g., in an Exif.GPSInfo tag, and/or the like).

Additionally or alternatively, the metadata can include data indicating one or more of a position of a camera that captured image 306, a rotation of a camera that captured image 306, a field of view of a camera that captured image 306, a depth of field of a camera that captured image 306, a time associated with image 306, whether imagery associated with a body of water is included in image 306, a level of visibility associated with image 306, whether image 306 includes imagery of one or more clouds, a version of the GIS application, a version of a web-browser application in which the GIS application is executing, and/or the like.

At (214), user device 102 can communicate the image data representing image 306 to user device 104, which can receive the image data representing image 306. Responsive to receiving the image data representing image 306, at (216), user device 104 can process the image data representing image 306. For example, user device 104 can be executing the GIS application executed by user device 102, a compatible application, and/or the like, and a user of user device 104 can open, import, load, and/or the like the image data representing image 306 in the application (e.g., by dragging a user interface element corresponding to the image data representing image 306 into a portion of an interface associated with the application similar to viewport 304, interfacing with a menu similar to menu 302, and/or the like). User device 104 (e.g., the GIS application executing thereon, and/or the like) can process the image data representing image 306 (e.g., render, display, and/or the like image 306). In accordance with aspects of the disclosure, user device 104 can reconstruct, based on the metadata included in the image data representing image 306, the scene comprising image 306 (e.g., the scene from which image 306 was saved as described above with respect to (212), and/or the like).

At (218), a user of user device 104 can navigate within the reconstructed scene comprising image 306 (e.g., by panning, zooming, and/or the like), which can cause user device 104 to receive data indicating a user intention to navigate within the scene. Responsive to receiving the data indicating the user intention to navigate within the scene, at (220), user device 104 can generate, based on the metadata included in the image data representing image 306, a request for a new image associated with the scene. For example, the user can pan the scene to the left and a request can be generated for an image comprising portions of the scene located to the left. The request can be generated based on the metadata included in the image data representing image 306. For example, the metadata could include data indicating a position of a camera that captured image 306, and the request could be generated to request an image captured by the camera at an adjacent position (e.g., to the left, and/or the like). At (222), user device 104 can communicate the request to computing system 110, which can receive the request. Responsive to receiving the request, at (224), computing system 110 can identify the requested new image, generate image data representing the new image, and, at (226), communicate the image data representing the new image to user device 104, which can receive the image data representing the new image. Responsive to receiving the image data representing the new image, at (228), user device 104 can process the image data representing the new image (e.g., render the new image, display the new image, and/or the like).

Figure 4:
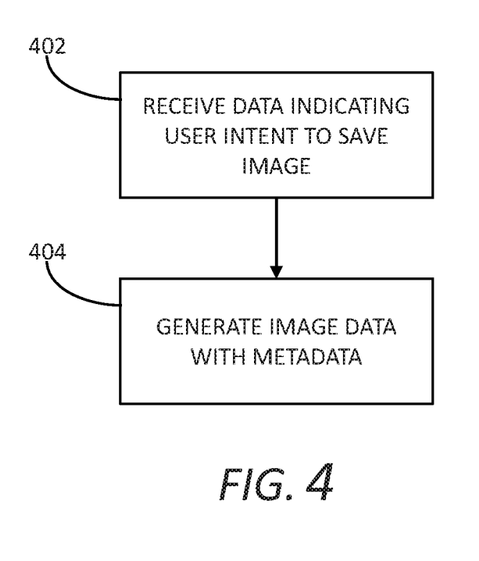
FIGS. 4, 5, and 6 depict example methods according to example embodiments of the present disclosure.
Figure 5:
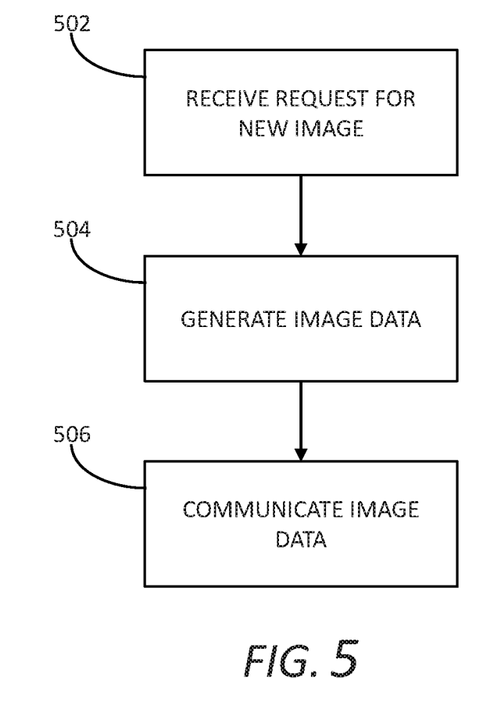
Figure 6:
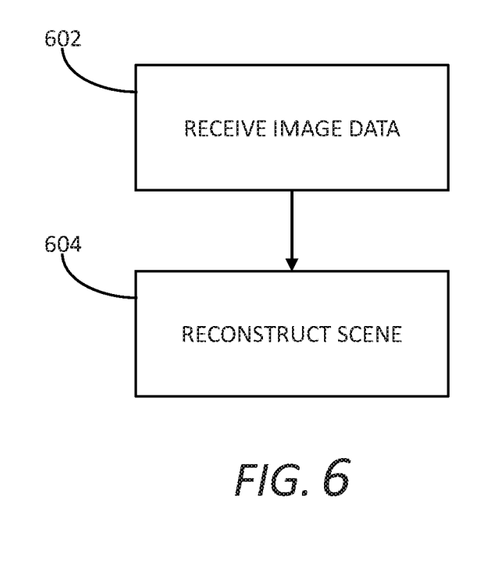

FIGS. 4, 5, and 6 depict example methods according to example embodiments of the present disclosure.

Referring to FIG. 4, at (402), data indicating a user intention to save an image from a GIS application can be received. For example, user device 102 can receive data indicating a user intention to save image 306. At (404), image data representing the image from the GIS application and comprising metadata configured to cause the GIS application to reconstruct a scene comprising the image can be generated. For example, user device 102 can generate image data representing image 306 and comprising metadata configured to cause the GIS application to reconstruct the scene comprising image 306.

Referring to FIG. 5, at (502), a request for a new image associated with a scene being depicted by a GIS application executing on one or more computing devices can be received. For example, computing system 110 can receive a request for a new image associated with the scene comprising image 306 from user device 104. At (504), image data representing the new image can be generated. For example, computing system 110 can generate image data representing the new image associated with the scene comprising image 306. At (506), the image data representing the new image can be communicated to the one or more computing devices. For example, computing system 110 can communicate the image data representing the new image associated with the scene comprising image 306 to user device 104.

Referring to FIG. 6, at (602), image data representing an image from a GIS application and comprising metadata configured to cause the GIS application to reconstruct a scene comprising the image can be received. For example, user device 104 can receive image data representing image 306 and comprising metadata configured to cause the GIS application to reconstruct a scene comprising image 306 from user device 102. At (604), the scene comprising the image can be reconstructed based on the metadata. For example, user device 104 can reconstruct the scene comprising image 306 based on the metadata included in the image data representing image 306.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:
   executing, by one or more computing devices, a first instance of a geographic information system (GIS) application to render an image of a scene from a camera position associated with a camera operated within the first instance of the GIS application;
   receiving, by the one or more computing devices, data indicating a user intention to save the image of the scene from the camera position associated with the camera operated within the first instance of the GIS application; and responsive to receiving the data indicating the user intention to save the image, generating, by the one or more computing devices, image data representing the image from the first instance of the GIS application and comprising metadata that describes the camera position associated with the camera operated within the first instance of the GIS application, wherein the metadata enables a second, different instance of the GIS application to reconstruct, within the second, different instance of the GIS application, the scene from the camera position associated with the camera operated within the first instance of the GIS application.

2. The computer-implemented method of claim 1, comprising:

communicating, by the one or more computing devices and to one or more other computing devices, the image data;

receiving, by the one or more other computing devices, the image data; and reconstructing, by the one or more other computing devices and based on the metadata, the scene comprising the image within the second, different instance of the GIS application.

3. The computer-implemented method of claim 2, comprising:

receiving, by the one or more other computing devices, data indicating a user intention to navigate within the scene; and responsive to receiving the data indicating the user intention to navigate within the scene:

generating, by the one or more other computing devices and based on the metadata, a request for a new image associated with the scene;

communicating, by the one or more other computing devices and to a remotely located computing system, the request for the new image; and receiving, by the one or more other computing devices and from the remotely located computing system, image data representing the new image.

4. The computer-implemented method of claim 1, wherein generating the image data comprises generating an image sequence comprising a plurality of frames that includes the image, each frame of the plurality of frames comprising:

image data representing an image from the scene corresponding to the frame; and metadata configured to cause the second, different instance of the GIS application to reconstruct at least a portion of the scene comprising the image from the scene corresponding to the frame.

5. The computer-implemented method of claim 1, wherein generating the image data comprises generating a serialized JavaScript object notation (JSON) object comprising the metadata.

6. The computer-implemented method of claim 1, wherein generating the image data comprises generating image data in accordance with an exchangeable image file format (EXIF) comprising one or more tags that comprise at least a portion of the metadata.

7. The computer-implemented method of claim 6, wherein the one or more tags include a tag designated for indicating a manufacturer of a camera.

8. The computer-implemented method of claim 1, wherein:

generating the image data comprises determining, based on the camera position associated with the image, global positioning system (GPS) data for the image; and the image data comprises metadata that includes the GPS data.

9. The computer-implemented method of claim 1, wherein the image comprises one or more of map imagery, satellite imagery, aerial imagery, panoramic imagery, ground-level imagery, or street-level imagery.

10. The computer-implemented method of claim 1, wherein the metadata comprises data indicating one or more of a rotation of the camera, a field of view of the camera, or a depth of field of the camera.

11. The computer-implemented method of claim 1, wherein the metadata comprises data indicating one or more of a time associated with the image, whether imagery associated with a body of water is included in the image, a level of visibility associated with the image, or whether the image includes imagery of one or more clouds.

12. The computer-implemented method of claim 1, wherein the metadata comprises data indicating one or more of a version of the first instance of the GIS application or a version of a web-browser application in which the first instance of the GIS application is executing.

13. The computer-implemented method of claim 1, wherein one or both of the first instance of the GIS application or the second, different instance of the GIS application is configured to execute within a web-browser application.

14. The computer-implemented method of claim 1, wherein receiving the data indicating the user intention to save the image comprises receiving the data indicating the user intention in response to a user dragging at least a portion of the image from a user interface of the first instance of the GIS application.

15. A system comprising:

one or more processors; and a memory storing instructions that when executed by the one or more processors cause the system to perform operations comprising:

providing, to one or more first computing devices executing a first instance of a geographic information system (GIS) application, an image of a scene from a camera position associated with a camera operated within the first instance of the GIS application;

providing, to the one or more first computing devices, metadata that describes the camera position associated with the camera operated within the first instance of the GIS application, wherein the metadata enables a second, different instance of the GIS application to reconstruct, within the second, different instance of the GIS application, the scene from the camera position associated with the camera operated within the first instance of the GIS application;

receiving, from one or more second computing devices executing the second, different instance of the GIS application, a request for a new image of the scene from the camera position associated with the camera operated within the first instance of the GIS application, the request comprising data generated, by the second, different instance of the GIS application based on the camera position included within the metadata; and responsive to receiving the request, communicating, to the one or more second computing devices, image data representing the new image of the scene from the camera position.

16. The system of claim 15, wherein the metadata comprises data indicating one or more of a rotation of the camera, a field of view of the camera, or a depth of field of the camera.

17. The system of claim 15, wherein the metadata comprises data indicating one or more of a time associated with the image, whether imagery associated with a body of water is included in the image, a level of visibility associated with the image, or whether the image includes imagery of one or more clouds.

18. One or more non-transitory computer-readable media comprising instructions that when executed by one or more computers cause the one or more computers to perform operations comprising:

receiving, from one or more other computers, image data representing an image of a scene from a first instance of a geographic information system (GIS) application, the image of the scene rendered by the first instance of the GIS application from a camera position associated with a camera operated within the first instance of the GIS application and comprising metadata that describes the camera position associated with the camera operated within the first instance of the GIS application, wherein the metadata enables a second, different instance of the GIS application to reconstruct the scene from the camera position associated with the camera operated within the first instance of the GIS application; and responsive to receiving the image data, reconstructing, based on the metadata and within the second, different instance of the GIS application, the scene from the camera position associated with the camera operated within the first instance of the GIS application.

19. The one or more non-transitory computer-readable media of claim 18, wherein the metadata comprises data indicating one or more of, a rotation of the camera, a field of view of the camera, or a depth of field of the camera.

20. The one or more non-transitory computer-readable media of claim 18, wherein the metadata comprises data indicating one or more of a time associated with the image, whether imagery associated with a body of water is included in the image, a level of visibility associated with the image, or whether the image includes imagery of one or more clouds.

* * * * *